(12) United States Patent
Yin

(10) Patent No.: US 9,696,594 B2
(45) Date of Patent: Jul. 4, 2017

(54) DISPLAY SUBSTRATE AND FABRICATING METHOD THEREOF, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Xiaobin Yin, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/570,109

(22) Filed: Dec. 15, 2014

(65) Prior Publication Data

US 2016/0062170 A1 Mar. 3, 2016

(30) Foreign Application Priority Data

Aug. 28, 2014 (CN) .......................... 2014 1 0433561

(51) Int. Cl.
G02F 1/1335 (2006.01)
G02F 1/1339 (2006.01)

(52) U.S. Cl.
CPC .................. *G02F 1/13394* (2013.01); *G02F 2001/13396* (2013.01)

(58) Field of Classification Search
None
See application file for complete search history.

(56) References Cited

U.S. PATENT DOCUMENTS

2013/0148062 A1* 6/2013 Liang ................ G02F 1/133512
349/110
2015/0370115 A1* 12/2015 Ge ........................ G02F 1/1368
349/43

FOREIGN PATENT DOCUMENTS

| CN | 102654688 A | 9/2012 |
| CN | 102955297 A | 3/2013 |
| CN | 103869548 A | 6/2014 |
| TW | 201324001 A1 | 6/2013 |

OTHER PUBLICATIONS

1st office action issued in Chinese application No. 201410433561.0 dated Aug. 2, 2016.

* cited by examiner

*Primary Examiner* — Donald Raleigh
(74) *Attorney, Agent, or Firm* — Nath, Goldberg & Meyer; Joshua B. Goldberg; Christopher Homas

(57) ABSTRACT

The invention discloses a display substrate, a fabricating method thereof and a display device. The display substrate comprises a base substrate, a black matrix, a main photo spacer and a sub photo spacer. The black matrix is located above the base substrate. The cover layer is located above the black matrix. The main photo spacer and the sub photo spacer are located on the cover layer and within a region corresponding to the black matrix. A first recess is provided in a region of the cover layer corresponding to the black matrix. The sub photo spacer is located in the first recess.

11 Claims, 5 Drawing Sheets

DISPLAY SUBSTRATE AND FABRICATING METHOD THEREOF, AND DISPLAY DEVICE

CROSS-REFERENCE TO RELATED APPLICATION

The present application claims priority based on Chinese Patent Application No. 201410433561.0 filed on Aug. 28, 2014, the entire content of which is incorporated herein by reference.

FIELD OF THE INVENTION

The present invention relates to the field of display technology, and particularly to a display substrate, a fabricating method thereof and a display device including the display substrate.

BACKGROUND OF THE INVENTION

Liquid crystal display is the most popular flat panel display at present. Thin Film Transistor Liquid Crystal Display (TFT-LCD) is a staple liquid crystal display. Display device is an important component in the liquid crystal display. In general, a display device comprises an array substrate and a color filter (CF) substrate aligned with each other to form a cell, a liquid crystal layer being filled between the array substrate and the color filter substrate. In order that the display device has a certain cell gap, photo spacers should be disposed between the array substrate and the color filter substrate. The color filter substrate may comprise a base substrate, and a black matrix and a color matrix pattern formed above the base substrate. A cover layer is formed above the black matrix and the color matrix pattern, and the photo spacers may be formed on the cover layer. The photo spacers may be formed by depositing material layer of photo spacer and then patterning the material layer of photo spacer. The patterning process may include exposing, developing and etching. Generally, photo spacers may be classified into main photo spacers (main PSs) and sub photo spacers (sub PSs). Main PSs and sub PSs are located on the cover layer with a flat surface, and the height of main PS is larger than that of sub PS. Thus, there is main-sub segment difference (M-S segment difference) between the main PS and the sub PS, which is a height difference between top of the main PS and top of the sub PS. After the color filter substrate and the array substrate are aligned with each other to form a cell, the main PSs are supporting directly between the color filter substrate and the array substrate as main support, while the sub PSs do not contact with the array substrate under normal circumstances. Only when an external force acts on the substrates will the sub PSs play an auxiliary support role so as to prevent the main PSs from being damaged due to overpressure.

The main PSs and the sub PSs are fabricated simultaneously by a patterning process at a time. Fabricating main PSs and sub PSs with a M-S segment difference less than 0.2 μm therebetween can be implemented merely by adjusting process parameters in the patterning process. Fabricating main PSs and sub PSs with a M-S segment difference less than 0.6 μm and more than 0.2 μm therebetween can be implemented by using a half-tone mask in the patterning process. Transmittance of a portion of the half-tone mask corresponding to the main PSs is different from that of a portion of the half-tone mask corresponding to the sub PSs. Accordingly, exposure intensities of different portions are different in the exposing process, ultimately resulting in the main PSs and the sub PSs with respective heights. However, in practice, it is difficult to form main PSs and sub PSs with larger M-S segment difference by using the half-tone mask.

In sum, with the technical solution of the prior art, M-S segment difference between the formed main PSs and sub PSs is small, and it is difficult to form main PSs and sub PSs with larger M-S segment difference.

SUMMARY OF THE INVENTION

The present invention provides a display substrate, a fabricating method thereof and a display device comprising the display substrate in which main PSs and sub PSs with larger M-S segment difference can be formed.

In order to achieve the above object, the invention provides a display substrate comprising a base substrate, a black matrix, a cover layer, a main photo spacer and a sub photo spacer, wherein the black matrix is located above the base substrate, the cover layer is located above the black matrix, the main photo spacer and the sub photo spacer are located on the cover layer and in a region corresponding to the black matrix, a first recess is provided in the region of the cover layer corresponding to the black matrix, and the sub photo spacer is located in the first recess.

Optionally, the display substrate further comprises a color matrix pattern above the base substrate, wherein the cover layer is located above the color matrix pattern, a second recess is formed in a portion of the color matrix pattern over the black matrix, the second recess is located under the first recess, and the first recess is formed by a portion of the cover layer in the second recess.

Optionally, the second recess has a cross section of a rectangle, trapezoid or ladder shape.

Optionally, a width of bottom of the first recess is larger than or equal to that of bottom of the sub photo spacer.

Optionally, the main photo spacer has a height equal to that of the sub photo spacer, there is a main-sub segment difference between the main photo spacer and the sub photo spacer, and the main-sub segment difference is equal to depth of the first recess.

In order to achieve the above object, the invention provides a display device comprising the above display substrate and an opposite substrate arranged opposite to the display substrate.

In order to achieve the above object, the invention provides a fabricating method of display substrate comprising steps of:

forming a black matrix above a base substrate;

forming, above the black matrix, a cover layer with a first recess which is located in a region of the cover layer corresponding to the black matrix; and forming a main photo spacer and a sub photo spacer on the cover layer so that the main photo spacer and the sub photo spacer are located in the region corresponding to the black matrix, and the sub photo spacer is located in the first recess.

Optionally, the step of forming above the black matrix the cover layer with the first recess comprises: forming the cover layer above the black matrix; and forming the first recess in the region of the cover layer corresponding to the black matrix by a patterning process.

Optionally, the fabricating method further comprises following steps before the step of forming above the black matrix the cover layer with the first recess: forming a color matrix pattern above the base substrate above which the black matrix has been formed so that a second recess is formed in a portion of the color matrix pattern located over the black matrix, the second recess being located under the first recess; and the step of forming above the black matrix the cover layer with the first recess comprises: forming the cover layer above the color matrix pattern so that a portion of the cover layer located in the second recess forms the first recess.

Optionally, the main photo spacer has a height equal to that of the sub photo spacer, and there is a main-sub segment difference between the main photo spacer and the sub photo spacer, the main-sub segment difference being equal to depth of the first recess.

The present invention has the following benefit effects.

In the display substrate, the fabricating method thereof and the display device according to the present invention, the main photo spacer and the sub photo spacer are located on the cover layer and above the black matrix, a first recess is provided in the cover layer, and the sub photo spacer is located in the first recess so as to form a M-S segment difference between the main photo spacer and the sub photo spacer. Thus, it is easy to form the main photo spacer and the sub photo spacer with a larger M-S segment difference therebetween.

DETAILED DESCRIPTION OF THE EMBODIMENTS

The display substrate, the fabricating method thereof and the display device provided by the invention are described below in detail in conjunction with accompanying drawings, in order that a skilled person in the art may fully understand the technical solutions of the invention.

Figure 1:
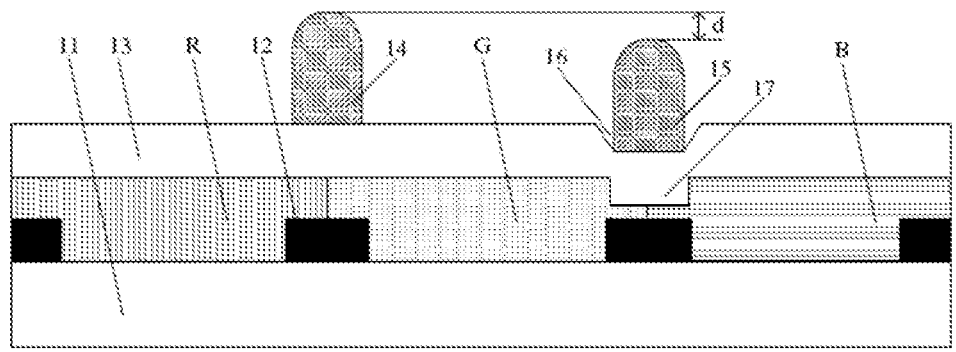
FIG. 1 is a schematic diagram showing a structure of a display substrate provided by a first embodiment of the invention.

FIG. 1 is a schematic diagram showing a structure of a display substrate provided by a first embodiment of the invention. As shown in FIG. 1, the display substrate may comprise a base substrate 11, a black matrix 12, a cover layer 13, a main PS 14 and a sub PS 15. The black matrix 12 is located above the base substrate 11. The cover layer 13 is located above the black matrix 12. The main PS 14 and the sub PS 15 are located on the cover layer 13, and positioned in a region corresponding to the black matrix 12. A first recess 16 is provided in the cover layer 13, and the sub PS 15 is located in the first recess 16. It can be understood that, although only one main PS 14 and one sub PS 15 are shown in FIG. 1, the number of the main PS 14 and the number of the sub PS 15 are not limited to this. For example, a plurality of main PSs 14 and a plurality of sub PSs 15 may be provided, and correspondingly, a plurality of first recesses 16 may be provided.

The display substrate may further comprise a color matrix pattern above the base substrate 11. The color matrix pattern may be formed above the base substrate 11 above which the black matrix 12 has been formed. The color matrix pattern may have a portion located over the base substrate 11 and a portion located over the black matrix 12. The cover layer 13 may be located above the color matrix pattern. A second recess 17 is formed in the portion of the color matrix pattern located over the black matrix 12. The cover layer 13 may have a portion filled in the second recess 17. The first recess 16 is formed in the portion of the cover layer 13 which is filled in the second recess 17. In other words, the first recess 16 is formed in a portion of the cover layer 13 which corresponds to the second recess 17. In a case that a plurality of sub PSs 15 and a plurality of first recesses 16 are provided, a plurality of second recesses 17 may also be provided. In the present embodiment, the color matrix pattern may comprise red patterns R, green patterns G and blue patterns B, which are collectively referred to as color patterns hereinafter. Red patterns R, green patterns G and blue patterns B may be arranged sequentially above the base substrate 11 so as to form the color matrix pattern. In practical applications, the color matrix pattern may comprise patterns of other colors, which will not be enumerated herein. As shown in FIG. 1, since each color pattern may have a portion located over the base substrate 11 and a portion located over the black matrix 12 adjacent to this color pattern, adjacent portions of adjacent color patterns may located over the black matrix 12. Thus, the second recess 17 may be formed in the adjacent portions of the adjacent color patterns over the black matrix 12. For example, in FIG. 1, the second recess 17 is formed in the adjacent portions, over the black matrix, of the green pattern G and the blue pattern B which are adjacent to each other.

In the present embodiment, the second recess 17 may have a cross section in a shape of rectangle. Depth of the second recess 17 and width of bottom of the second recess 17 may be set as required, as long as the depth of and the width of bottom of the second recess 17 is set such that size of each item for the first recess 16 can satisfy a desired predetermined value.

To ensure that the sub PS 15 can be placed in the first recess 16 stably, a width of bottom of the first recess 16 may be larger than or equal to a width of bottom of the sub PS 15. In the present embodiment, preferably, the width of bottom of the first recess 16 is equal to the width of bottom of the sub PS 15. In the present embodiment, the first recess 16 has a cross section in a shape of trapezoid with a bottom width smaller than a top width thereof. It can be understood that the cross section of the second recess 17 may have any other suitable shape.

In a case that the main PS 14 has a height equal to that of the sub PS 15, there is a M-S segment difference d between the main PS 14 and the sub PS 15, and the M-S segment difference d is identical to the depth of the first recess 16. In this embodiment, the cover layer 13 is a flat layer, i.e., the portion of the cover layer 13 except for the first recess 16 is a structure with flat surface. Since the sub PS 15 is located in the first recess 16, and the main PS 14 is located on the flat portion of the cover layer 13, in a case that the height of the main PS 14 is identical to that of the sub PS 15, there is M-S segment difference d between the main PS 14 and the sub PS 15, and the M-S segment difference d is equal to the depth of the first recess 16.

In this embodiment, preferably, thickness of the cover layer 13 is in a range of 1.5 μm to 2 μm, and thickness of the color matrix pattern is in a range of 1.5 μm to 2 μm.

In this embodiment, the M-S segment difference d between the main PS 14 and the sub PS 15 may be 0.6 μm or more.

In the display substrate of this embodiment, the main PS and the sub PS are located on the cover layer and in a region corresponding to the black matrix, a first recess is provided in the cover layer, and the sub PS is located in the first recess while the main PS is not located in the first recess, so that a M-S segment difference occurs between the main PS and the sub PS. Thus, it is easy to obtain a larger M-S segment difference between the main PS and the sub PS.

Figure 2:
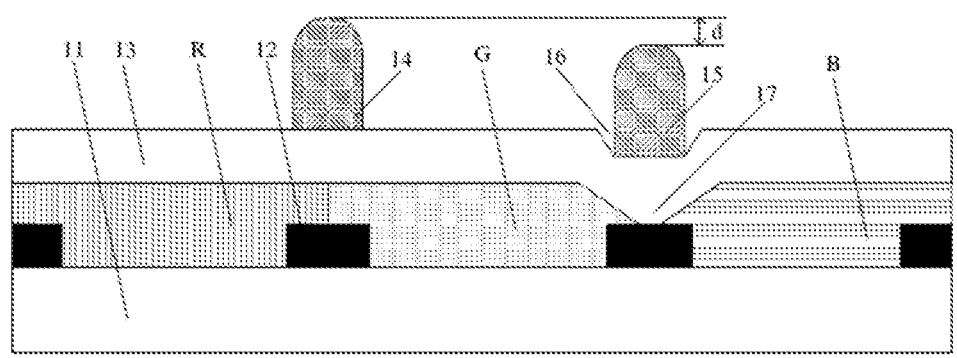
FIG. 2 is a schematic diagram showing a structure of a display substrate provided by a second embodiment of the invention.

FIG. 2 is a schematic diagram showing a structure of a display substrate provided by a second embodiment of the invention. As shown in FIG. 2, the display substrate in this embodiment is different from that in the first embodiment in that the shape of cross section of the second recess 17 is a trapezoid. Specifically, the shape of cross section of the second recess 17 is a trapezoid with a bottom width less than a top width thereof. Other structures of the display substrate of this embodiment are the same as those in the above first embodiment, and descriptions for them will be omitted here.

In practical applications, the second recess 17 may have any other shape, such as a ladder shape.

In the display substrate of this embodiment, the main PS and the sub PS are located on the cover layer and in a region corresponding to the black matrix, a first recess is provided in the cover layer, and the sub PS is located in the first recess while the main PS is not located in the first recess, so that a M-S segment difference occurs between the main PS and the sub PS. Thus, it is easy to form a main PS and a sub PS with a larger M-S segment difference therebetween.

Figure 3:
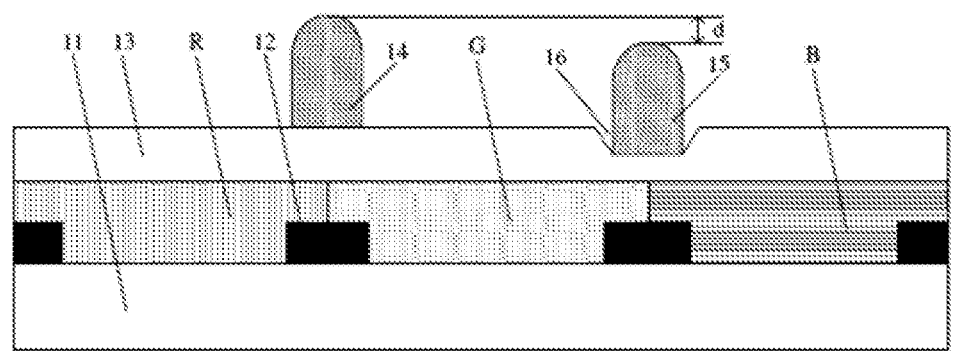
FIG. 3 is a schematic diagram showing a structure of a display substrate provided by a third embodiment of the invention.

FIG. 3 is a schematic diagram showing a structure of a display substrate provided by a third embodiment of the invention. As shown in FIG. 3, the display substrate may comprise a base substrate 11, a black matrix 12, a cover layer 13, a main PS 14 and a sub PS 15. The black matrix 12 is located above the base substrate 11. The cover layer 13 is located above the black matrix 12. The main PS 14 and the sub PS 15 are located on the cover layer 13, and positioned in a region corresponding to the black matrix 12. A first recess 16 is provided in a region of the cover layer 13 corresponding to the black matrix 12, and the sub PS 15 is located in the first recess 16.

The display substrate may further comprise a color matrix pattern above the base substrate 11. The color matrix pattern may be formed above the base substrate 11 above which the black matrix 12 has been formed, and the cover layer 13 may be formed above the color matrix pattern. In this embodiment, the color matrix pattern may comprise red patterns R, green patterns G and blue patterns B. Red patterns R, green patterns G and blue patterns B may be arranged sequentially above the base substrate 11. In practical applications, the color matrix pattern may comprise patterns of other colors, which will not be enumerated herein. Each color pattern may have a portion located over the base substrate 11 and a portion located over the black matrix.

The display substrate in this embodiment is different from that in the first embodiment in that, no second recess is formed in the portions of the adjacent color patterns corresponding to the black matrix. In other words, the display substrate in this embodiment does not comprise the second recess 17 in the display substrate of the first embodiment.

To ensure that the sub PS 15 can be placed in the first recess 16 stably, a width of bottom of the first recess 16 may be larger than or equal to a width of bottom of the sub PS 15. In the present embodiment, preferably, the width of bottom of the first recess 16 is equal to the width of bottom of the sub PS 15. In this embodiment, the first recess 16 may have a cross section in a shape of trapezoid which has a bottom width smaller than a top width thereof.

In a case that the main PS 14 has a height equal to that of the sub PS 15, there is a M-S segment difference d between the main PS 14 and the sub PS 15, and the M-S segment difference d is identical to the depth of the first recess 16. In this embodiment, the cover layer 13 is a flat layer, i.e., the portion of the cover layer 13 except for the first recess 16 is a structure with flat surface. Since the sub PS 15 is located in the first recess 16, and the main PS 14 is located on the flat portion of the cover layer 13, in a case that the height of the main PS 14 is identical to that of the sub PS 15, there is a M-S segment difference d between the main PS 14 and the sub PS 15, and the M-S segment difference d is equal to the depth of the first recess 16.

In this embodiment, preferably, thickness of the cover layer 13 is in a range of 1.5 μm to 2 μm, and thickness of the color matrix pattern is in a range of 1.5 μm to 2 μm.

In this embodiment, the M-S segment difference d between the main PS 14 and the sub PS 15 may be 0.6 μm or more.

In the display substrate of this embodiment, the main PS and the sub PS are located on the cover layer and in a region corresponding to the black matrix, a first recess is provided in the cover layer, and the sub PS is located in the first recess while the main PS is not located in the first recess, so that a M-S segment difference occurs between the main PS and the sub PS. Thus, it is easy to form a main PS and a sub PS with a larger M-S segment difference therebetween.

The fourth embodiment of the invention provides a display device which may comprise a display substrate and an opposite substrate arranged opposite to the display substrate. The display substrate may be any one of the display substrates provided by the first to third embodiments, and its detailed description will be omitted here.

A liquid crystal layer may be provided between the display substrate and the opposite substrate.

Optionally, the display substrate may be a color filter, and the opposite substrate may be an array substrate.

Optionally, the display substrate may be a substrate with a color filter on array (COA), and the opposite substrate may be a transparent substrate.

In the display device provided by this embodiment, the main PS and the sub PS are located on the cover layer and in a region corresponding to the black matrix, a first recess is provided in the cover layer, and the sub PS is located in the first recess while the main PS is not located in the first recess, so that a M-S segment difference occurs between the main PS and the sub PS. Thus, it is easy to form a main PS and a sub PS with a larger M-S segment difference therebetween.

Figure 4:
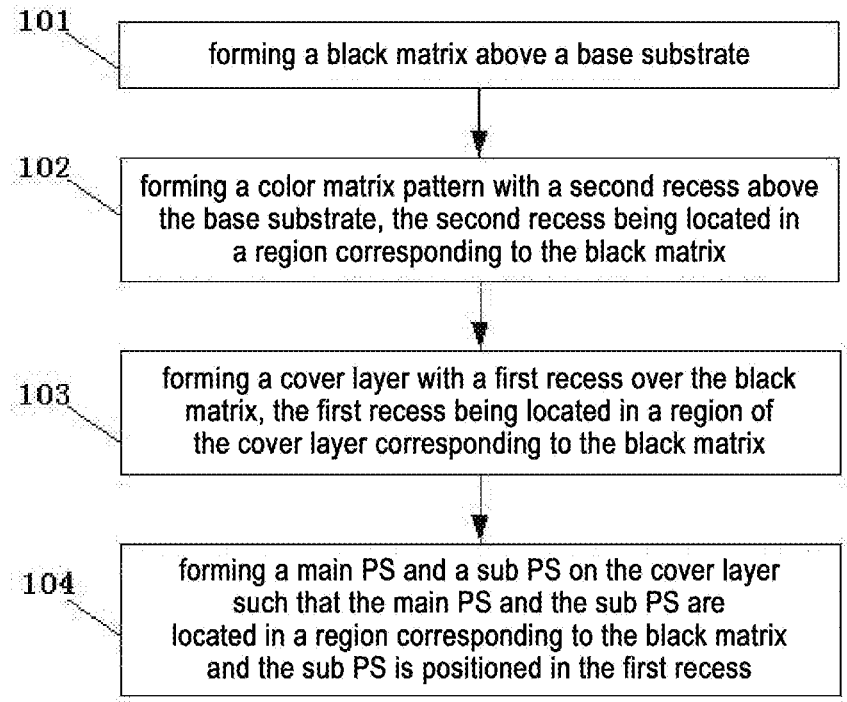
FIG. 4 is a schematic diagram showing a flow chart of a fabricating method of display substrate provided by a fourth embodiment of the invention.

FIG. 4 is a schematic diagram showing a flow chart of a fabricating method of display substrate provided by a fourth embodiment of the invention. As shown in FIG. 4, the method may comprise steps 101 to 104 as follows.

Step 101: forming a black matrix above a base substrate.

Step 102: forming a color matrix pattern above the base substrate above which the black matrix has been formed, and forming a second recess in a portion of the color matrix pattern located over the black matrix.

Figure 5A:
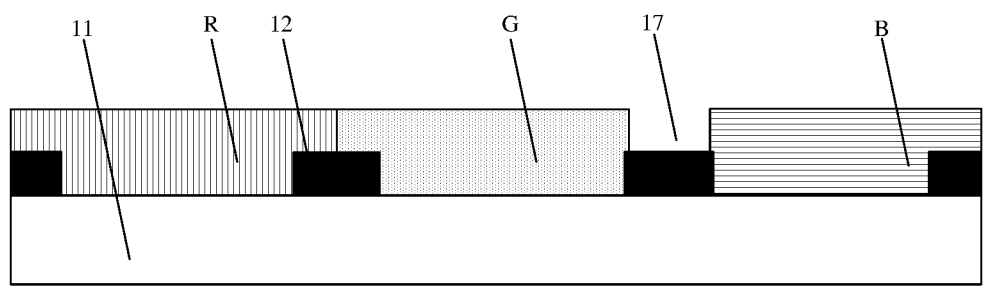
FIG. 5a is a schematic diagram showing a step of forming a black matrix and a color matrix pattern in the fabricating method of display substrate according to the fourth embodiment.

FIG. 5a is a schematic diagram showing a step of forming a black matrix and a color matrix pattern in the fabricating method of display substrate according to the fourth embodiment. As shown in FIG. 5a, a black matrix 12 is formed above a base substrate 11 by a patterning process, and a color matrix pattern is formed above the base substrate 11 above which the black matrix 12 has been formed by a patterning process. The color matrix pattern may have a portion located over the base substrate 11 and a portion located over the black matrix 12. A second recess 17 is formed in the portion of the color matrix pattern located over the black matrix 12. Although the bottom of the second recess 17 is an upper surface of the black matrix 12 in the embodiment shown in FIG. 5a, in other embodiments, the portion of the color matrix pattern located over the black matrix 12 may be partially removed by etching without exposing the upper surface of the black matrix 12, such that the bottom of the second recess 17 is a portion of the color matrix pattern. The color matrix pattern may comprise Red patterns R, green patterns G and blue patterns B. That is, Red patterns R, green patterns G and blue patterns B may be arranged sequentially above the base substrate 11 so as to form the color matrix pattern. Patterning process may comprise processes such as photoresist applying, exposing, developing, etching and photoresist striping, and so on. Mask used during exposing may be a mask obtained by modifying a conventional mask, or a new mask fabricated directly.

The above step 102 is an optional step.

Step 103: forming a cover layer with first recess(es) above the black matrix, the first recess(es) being located in a region of the cover layer corresponding to the black matrix.

Specifically, after the black matrix is formed above the base substrate, the cover layer may be formed above the black matrix, and the first recess may be formed in the region of the cover layer corresponding to the black matrix by a patterning process.

Figure 5B:
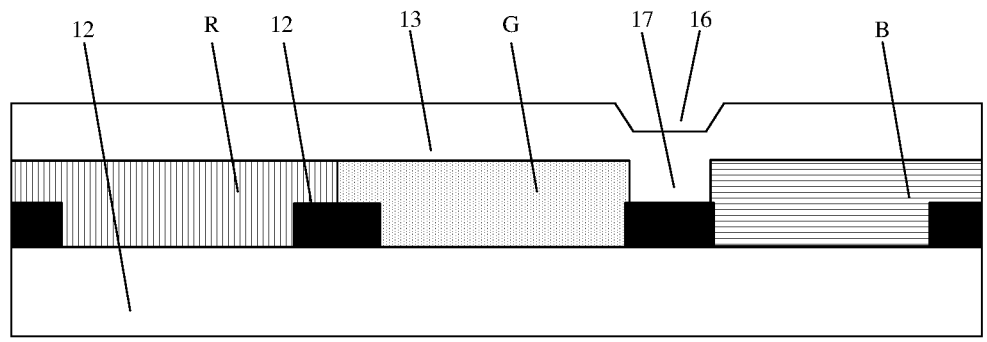
FIG. 5b is a schematic diagram showing a step of forming a cover layer in the fabricating method of display substrate according to the fourth embodiment.

Hereinafter, taking a case in which both a black matrix and a color matrix pattern are formed above the base substrate as an example, the step 103 will be described in detail. FIG. 5b is a schematic diagram showing a step of forming a cover layer in the fabricating method of display substrate according to the fourth embodiment. As shown in FIG. 5b, after both the black matrix and the color matrix pattern are formed above the base substrate, the cover layer 13 may be formed above the color matrix pattern and the black matrix. The cover layer 13 has a portion located in the second recess 17 so that the first recess 16 is formed in the portion of the cover layer 13 corresponding to the second recess 17 and the formed first recess 16 is positioned over the second recess 17. It can be understood that, since the second recess 17 is located in the region corresponding to the black matrix, the first recess 16 is also located in the region corresponding to the black matrix. The first recess 16 may be formed by a patterning process.

Specifically, for example, a cover layer 13 with uniform thickness may be formed above the base substrate as shown in FIG. 5a by a deposition process. Since there is a second recess 17 formed in the corresponding region over the black matrix, the level of the portion of the cover layer 13 deposited in the second recess 17 is lower than that of the portion of the cover layer 13 deposited in other region, thus the first recess 16 is formed. Alternatively, the cover layer 13 with the first recess 16 positioned over the second recess 17 may be formed by, after a layer of material of cover layer is formed by an appropriate deposition process, removing a part of the material of cover layer which is located in the second recess 17 through a process such as etching.

Step 104: forming a main PS and a sub PS on the cover layer such that the main PS and the sub PS are located in a region corresponding to the black matrix and the sub PS is positioned in the first recess.

Figure 5C:
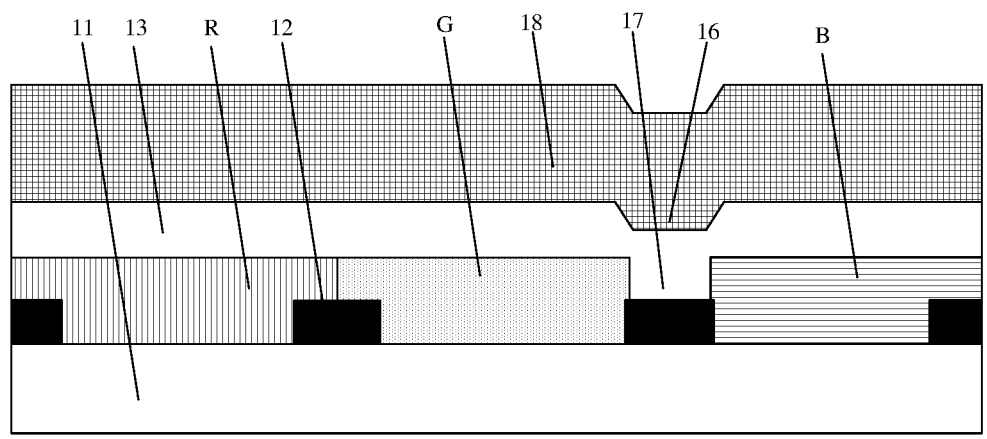
FIG. 5c is a schematic diagram showing a step of applying a material layer of photo spacer in the fabricating method of display substrate according to the fourth embodiment.

FIG. 5c is a schematic diagram showing a step of applying a material layer of photo spacer in the fabricating method of display substrate according to the fourth embodiment. As shown in FIG. 5c, a material layer of PS 18 is applied on the cover layer 13. Since there is the first recess 16 formed in the cover layer 13, the material layer 18 has a recess shape over the first recess 16. The material layer of PS 18 is exposed by using a mask. The exposed material layer of PS 18 is developed and etched so as to form the main PS 14 and the sub PS 15, as shown in FIG. 1. Preferably, in a case that the main PS 14 has a height equal to that of the sub PS 15, there is a M-S segment difference between the main PS 14 and the sub PS 15, and the M-S segment difference is equal to depth of the first recess 16. In this case, due to the first recess 16, it is unnecessary to fabricate a main PS 14 and a sub PS 15 with different heights respectively. Thus, the material layer of PS 18 may be exposed by using an ordinary mask (i.e., a mask having identical transmittances in its different portions) instead of a half-tone mask, which reduces cost of the mask.

The fabricating method of display substrate provided by this embodiment may be used to fabricate the display substrate provided by the first or the second embodiment. The detailed description of such display substrate may be referred to the descriptions for the above first or second embodiment.

In the display substrate fabricated by the fabricating method of display substrate of this embodiment, the main PS and the sub PS are located on the cover layer and in a region corresponding to the black matrix, a first recess is provided on the cover layer, and the sub PS is located in the first recess while the main PS is not located in the first recess, so that a M-S segment difference occurs between the main PS and the sub PS. Thus, it is easy to form a main PS and a sub PS with a larger M-S segment difference therebetween.

A fifth embodiment of the invention provides a fabricating method of display substrate, which may comprise the following steps 201 to 204.

Step 201: forming a black matrix above a base substrate.

Step 202: forming a color matrix pattern above the base substrate above which the black matrix has been formed.

Figure 6A:
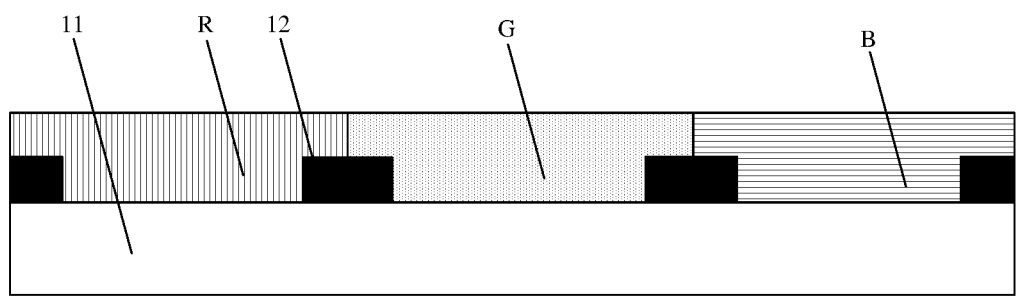
FIG. 6a is a schematic diagram showing a step of forming a black matrix and a color matrix pattern in a fabricating method of display substrate according to a fifth embodiment.

FIG. 6a is a schematic diagram showing a step of forming a black matrix and a color matrix pattern in a fabricating method of display substrate according to a fifth embodiment. As shown in FIG. 6a, a black matrix 12 is formed above the base substrate 11 by a patterning process, and a color matrix pattern is formed above the base substrate 11 above which the black matrix 12 has been formed by a patterning process. The color matrix pattern may comprise red patterns R, green patterns G and blue patterns B. Red patterns R, green patterns G and blue patterns B may be arranged sequentially above the base substrate 11 so as to form the color matrix pattern. Patterning process may comprise processes such as photoresist applying, exposing, developing, etching and photoresist striping, and so on.

The step 202 is an optional step.

Step 203: forming a cover layer with a first recess(es) above the black matrix, the first recess(es) being located in a region of the cover layer corresponding to the black matrix.

Figure 6B:
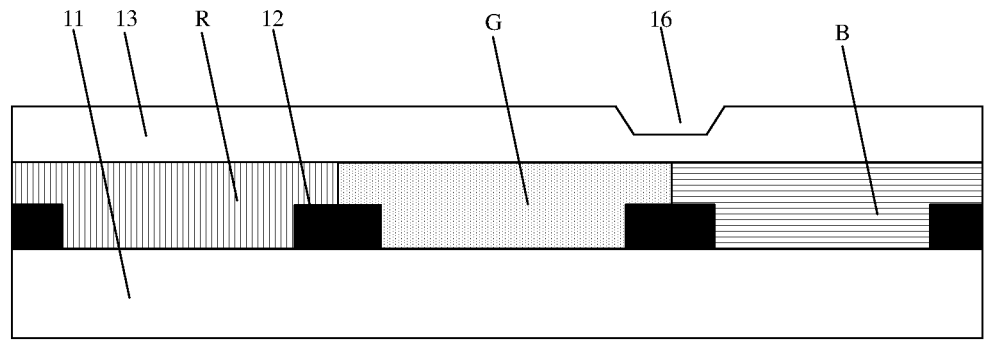
FIG. 6b is a schematic diagram showing a step of forming a cover layer in the fabricating method of display substrate according to the fifth embodiment.

FIG. 6b is a schematic diagram showing a step of forming a cover layer in the fabricating method of display substrate according to the fifth embodiment. As shown in FIG. 6b, a cover layer 13 is formed above the black matrix 12 and the color matrix pattern. First recess(es) 16 may be formed in a region of the cover layer 13 corresponding to the black matrix 12 by a patterning process. Patterning process may comprise processes such as photoresist applying, exposing, developing, etching and photoresist striping, and so on. Preferably, exposing process may be performed by using an ordinary mask (i.e., a mask having identical transmittances in its different portions) instead of a half-tone mask, which reduces cost of the mask.

Step 204: forming a main PS and a sub PS on the cover layer such that the main PS and the sub PS are located in a region corresponding to the black matrix and the sub PS is positioned in the first recess.

Figure 6C:
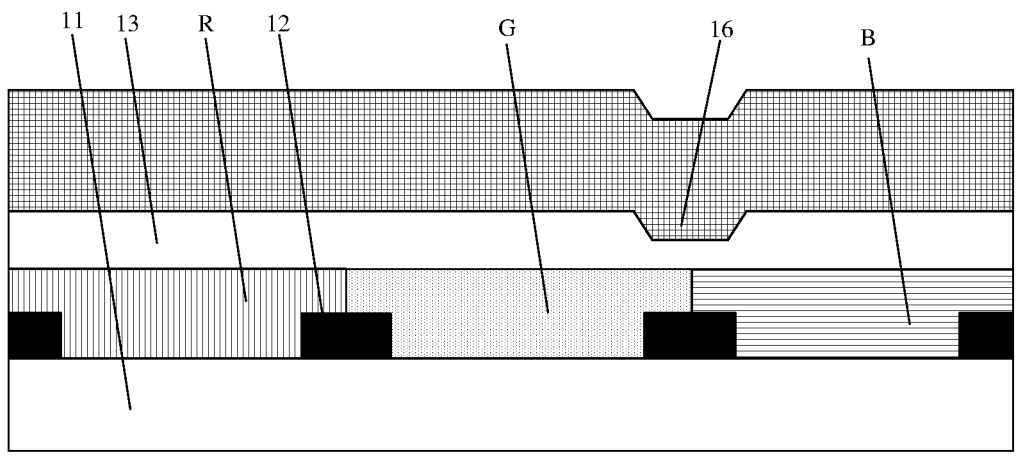
FIG. 6c is a schematic diagram showing a step of applying a material layer of photo spacer in the fabricating method of display substrate according to the fifth embodiment.
Figure 7:
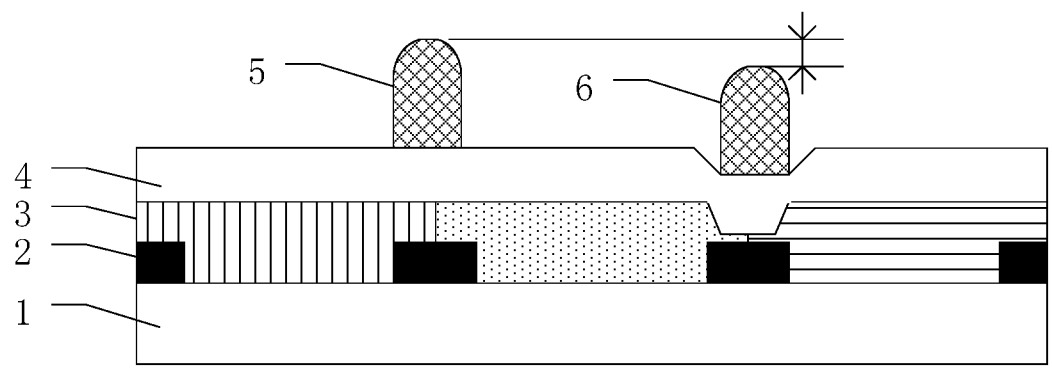
FIG. 7 is a schematic diagram showing a structure of a display substrate provided by an embodiment of the invention.

FIG. 6c is a schematic diagram showing a step of applying a material layer of photo spacer in the fabricating method of display substrate according to the fifth embodiment. As shown in FIG. 6c, a material layer of PS 18 is applied on the cover layer 13. Since there is the first recess 16 formed in the cover layer 13, the material layer 18 has a recess shape over the first recess 16. The material layer of PS 18 is exposed by using a mask. As shown in FIG. 3, the exposed material layer of PS 18 is developed and etched so as to form the main PS 14 and the sub PS 15. Preferably, in a case that the main PS 14 has a height equal to that of the sub PS 15, there is a M-S segment difference between the main PS 14 and the sub PS 15, and the M-S segment difference is equal to depth of the first recess 16. In this case, the material layer of PS 18 may be exposed by using an ordinary mask (i.e., a mask having identical transmittances in its different portions) instead of a half-tone mask, which reduces cost of the mask.

The fabricating method of display substrate provided by this embodiment may be used to fabricate the display substrate provided by the third embodiment. The detailed description of such display substrate may be referred to the descriptions for the above third embodiment.

In the display substrate fabricated by the fabricating method of display substrate of this embodiment, the main PS and the sub PS are located on the cover layer and in a region corresponding to the black matrix, a first recess is provided in the cover layer, and the sub PS is located in the first recess while the main PS is not located in the first recess, so that a M-S segment difference occurs between the main PS and the sub PS. Thus, it is easy to form a main PS and a sub PS with a larger M-S segment difference therebetween.

It can be understood that the above embodiments are only exemplary embodiments for illustrating the principle of the present invention; the present invention is not limited thereto. As for a person skilled in the art, various variations and improvements can be made without departing from the spirit and essence of the present invention, and should be considered to be fallen within the protection scope of the present invention.

The invention claimed is:

1. A display substrate, comprising a base substrate, a black matrix, a cover layer, a main photo spacer and a sub photo spacer, characterized in that the black matrix is located above the base substrate, the cover layer is located above the black matrix, the main photo spacer and the sub photo spacer are located on the cover layer and in a region corresponding to the black matrix, wherein a first recess is provided in a region of the cover layer corresponding to the black matrix, and the sub photo spacer is located in the first recess, wherein the display substrate further comprises a color matrix pattern above the base substrate, the cover layer is located above the color matrix pattern, a second recess is formed in a portion of the color matrix pattern over the black matrix, the second recess is located under the first recess, and the first recess is formed by a portion of the cover layer in the second recess, wherein the second recess has a cross section of a rectangle or ladder shape, and the second recess has a bottom, which is a portion of the color matrix pattern, and does not expose a surface of the black matrix adjacent to the second recess, and wherein a thickness of the cover layer is in a range of 1.5 µm to 2 µm, a thickness of the color matrix pattern is in a range of 1.5 µm to 2 µm, and a height difference between a top of the main photo spacer and a top of the sub photo spacer is 0.6 µm or more.

2. The display substrate of claim 1, wherein a width of bottom of the first recess is larger than or equal to that of bottom of the sub photo spacer.

3. The display substrate of claim 1, wherein the main photo spacer has a height equal to that of the sub photo spacer but they are on different planes, the difference being equal to a depth of the first recess.

4. The display substrate of claim 2, wherein the main photo spacer has a height equal to that of the sub photo spacer but they are on different planes, the difference being equal to a depth of the first recess.

5. A display device, characterized by comprising the display substrate of claim 1 and an opposite substrate arranged opposite to the display substrate.

6. The display device of claim 5, wherein a width of bottom of the first recess is larger than or equal to that of bottom of the sub photo spacer.

7. The display device of claim 5, wherein the main photo spacer has a height equal to that of the sub photo spacer but they are on different planes, the difference being equal to a depth of the first recess.

8. A fabricating method of display substrate, characterized by comprising steps:

forming a black matrix above a base substrate;

forming a color matrix pattern above the base substrate above which the black matrix has been formed so that a second recess is formed in a portion of the color matrix pattern located over the black matrix, wherein the second recess has a cross section of a rectangle or ladder shape, and the second recess has a bottom, which is a portion of the color matrix pattern, and does not expose a surface of the black matrix adjacent to the second recess;

forming, above the color matrix pattern, a cover layer with a first recess which is located in a region of the cover layer corresponding to the black matrix, so that a portion of the cover layer located in the second recess forms the first recess; and forming a main photo spacer and a sub photo spacer on the cover layer so that the main photo spacer and the sub photo spacer are located in a region corresponding to the black matrix, and the sub photo spacer is located in the first recess, wherein a thickness of the cover layer is in a range of 1.5 μm to 2 μm, a thickness of the color matrix pattern is in a range of 1.5 μm to 2 μm, and a height difference between a top of the main photo spacer and a top of the sub photo spacer is 0.6 μm or more.

9. The fabricating method of claim 8, wherein the step of forming above the black matrix the cover layer with the first recess comprises:

forming the cover layer above the black matrix; and forming the first recess in a region of the cover layer corresponding to the black matrix by a patterning process.

10. The fabricating method of claim 8, wherein the main photo spacer has a height equal to that of the sub photo spacer but they are on different planes, the difference being equal to a depth of the first recess.

11. The fabricating method of claim 9, wherein the main photo spacer has a height equal to that of the sub photo spacer but they are on different planes, the difference being equal to a depth of the first recess.

\* \* \* \* \*